Feb. 14, 1961 H. C. RESSLER 2,971,810

GRAPHIC RECORDING APPARATUS

Filed Aug. 13, 1958

INVENTOR
HUGH C. RESSLER
BY J. B. Burke
ATTORNEY

United States Patent Office 2,971,810
Patented Feb. 14, 1961

2,971,810

GRAPHIC RECORDING APPARATUS

Hugh C. Ressler, Bayside, N.Y., assignor, by mesne assignments, to Hogan Faximile Corporation, a corporation of Delaware Filed Aug. 13, 1958, Ser. No. 754,733

16 Claims. (Cl. 346—74)

This invention relates to the art of graphic recorders and particularly concerns an electrolytic recorder for producing a transparent recording.

Heretofore there has existed a need for producing transparent graphic records electrically from signals representative of graphic copy transmitted from a distant point. A projection apparatus may be used to direct light through the transparent copy which is then optically projected usually in magnified form upon a screen.

The transparent records were produced previously by projecting a modulated light beam on a sensitized photographic film and developing the film chemically to produce the graphic record as transparent areas on an opaque background. In order to avoid the use of photographic processes and the necessary chemical development, attempts have been made to employ a transparent plastic film coated with an electrically resistant coating which was burned off selectively by styli to which electrical signals were applied. This method produced very crude reproduction of copy, since it was not possible to limit the area of burning to fine recording points. An alternative method proposed was to cut off with a sharp stylus portions of an opaque coating carried on a transparent film base. This method and other similar methods have all failed to attain commercial acceptance largely because it was not possible to attain sufficiently fine quality of recording and because special apparatus was required for their use.

The present invention has as a principal object provision of a means for electrolytically recording a high quality fine definition transparent record. A further object is to provide a recording means whereby a known type of recorder can easily be adapted to produce transparent records. Another object is to provide electrolytic recording means for producing a record on a non-metallic recording medium such as conventional electrolytic recording paper. A still further object is to provide a means for simultaneously producing a transparent record and a record on an opaque or substantially opaque paper sheet. Another object is to produce electrolytically a transparent or half-tone picture on a transparent base.

The invention will be best understood from the following description taken together with the drawing, wherein.

Figures 1, 2:
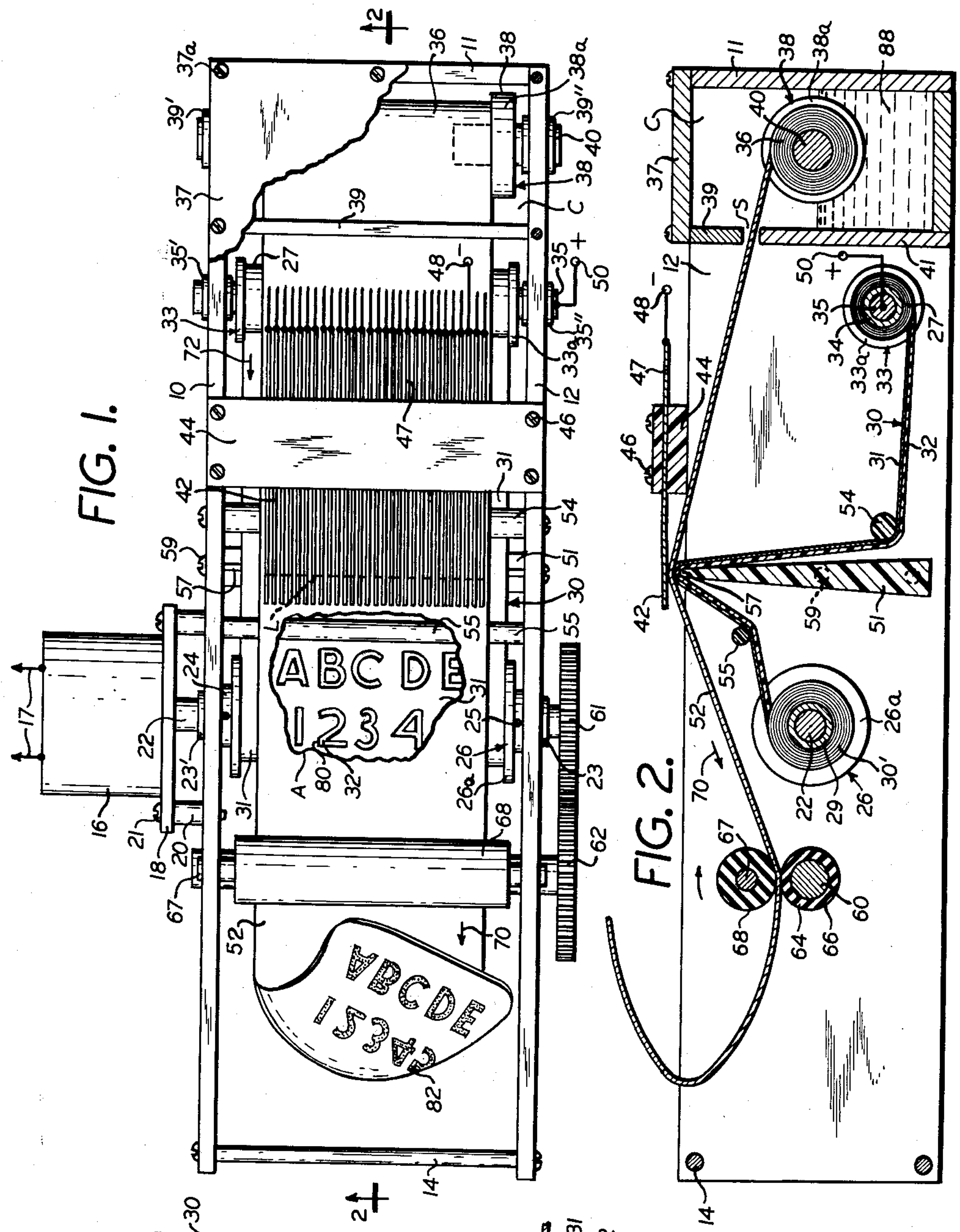
Fig. 1 is a top plan view of a recorder embodying the invention.
Fig. 2 is a sectional view taken on line 2—2 of Fig. 1.

In the drawing there is shown a recorder including a frame formed by a pair of flat rectangular plates 10 and 12 joined together at one end by bars 14 at their corners and by a plate 11 at the other end. A motor 16 energized via wires 17 is mounted on a bracket 18 by spacers 20 secured by screws 21 to plate 10. This motor has a shaft 22 journaled in insulated sleeve bearings 23, 23′ and passing through plates 10 and 12.

The shaft carries a roller or reel 26 extending transversely between the plates. The reel has hubs 24 and flanges 26*a* secured by screws 25 to shaft 22. The reel has a cylindrical sleeve 29 arranged for taking up in a roll 30′ recorded portions of a web 30. This web consists of a very thin opaque metal film coating 31 on a transparent plastic film base 32 made of a polyester, cellulose, acetate or the like. Web 30 is carried in a roll 27 on a supply reel or roller 33 having end flanges 33*a* and a metal sleeve 34 frictionally engaged on shaft 35. This shaft is journaled to rotate in insulated bearings 35′, 35″ in the plates 10 and 12. A porous paper supply roll 36 is carried on a reel 38 having end cores 40 and end flanges 38*a* removably supported in bearings 39′ and 39″ in plates 10 and 12. Roll 36 is disposed in a humidor compartment C formed by side plates 10, 12, and plate 11, removable top plate 37, bottom plate 43 and partitions 39 and 41. These two partitions are disposed in coplanar array and are spaced apart to provide a slit S through which the paper web 52 passes out of the compartment. Plate 37 is removably secured by screws 37*a* on plates 10, 12. The paper web 52 is threaded under a plurality of stationary flexible metal wire styli 42 disposed in a spaced parallel array transversely across the paper with each stylus extending longitudinally parallel to plates 10 and 11. The styli are flexible members made of stainless steel or other metal which may be embedded in a plastic or ceramic block 44 mounted on the edges of plates 10 and 12 by screws 46. The flexible ends of the styli extend out of one end of the block and their other conductive ends 47 extend out of the other end of the block and are individually connected to the negative terminals 48 of marking circuits as indicated diagrammatically by arrows in Figs. 1 and 2. A positive electrical potential is applied to the metal shaft 35 from a common positive terminal 50 of the marking circuits. The metal film 31 is thus positively charged. The web 30 is threaded underneath a round insulated guide bar 54 which smooths the web, and over a wedge shaped insulated platen 51. Screws 59 secure the platen to the side plates 10, 12. The platen 51 has a very fine edge 57 across which the several styli 42 are pressed with the recording paper and foil disposed between the styli and platen. Styli 42 are so mounted in block 44 that they exert individually spring pressure on the paper 52 and web 30 along marking line L where the styli cross the the supporting edge 57 of the platen. The thickness of the web should not exceed 0.0005 of an inch (½ mil) and the individual styli should be about 0.001 to 0.002 of an inch (1 to 2 mils) in diameter so that a square recording spot for each stylus on the paper and juxtaposed web at marking line L is materially less than 0.01 of an inch on each side. Edge 57 should be made as fine as possible, but not so fine as to cut the web 30 which is drawn over it.

Web 30 is threaded under another insulated guide and tensioning bar 55 which has a free end spaced from side plate 12 to permit web 30 to be easily threaded under the bar. The web terminates at take-up roll 30′.

The recorder is so arranged that both the paper and web 30 can be marked simultaneously depending on the signals applied to the various styli via circuits 48 and depending on the impregnant of the paper. The paper web 52 is advanced by means of drive roller shaft 60 which is covered with a resilient rubber sleeve 66. An idler roller having a shaft 67 and a resilient rubber sleeve 68 coacts with sleeve 66 for advancing the paper longitudinally in a direction indicated by arrow 70. Gear 61 is mounted on shaft 22 and engages gear 62 on shaft 60 to advance the paper at a speed equal to the advance of web 30. High recording speeds of several feet per second are possible with this apparatus.

In operation of the recorder, a positive potential is applied from a marking signal source at terminal 50. Negative marking signals are applied to the several styli from signal sources 48. A common positive voltage is applied to metal film 31 via shaft 35 and sleeve 34. The paper 52 is of an electrolytic marking type impregnated with an electrolyte and catechol or other marking compound such as disclosed in Patent 2,358,839 to Wagner et al. This paper is normally in a moist condition and is kept moist by storage in the substantially closed humidor compartment C. The film 31 is extremely thin of the order of 0.0001 (1 micron) or less. It should be just thick enough to be opaque to ordinary white light. This film may be aluminum, copper, titanium, iron, nickel, chromium, or any other metal which is capable of being dissolved electrolytically into the impregnant of the paper 52 when an electric current is passed through the paper between the film 31 and the negative electrodes or styli 47. As the marking current is passed through the paper the metal of the film 31 will be dissolved off at the marking points on line L. The styli 42 should be very closely spaced of the order of fifty or more to the inch so that a clear transparent area of the film 32 is exposed wherever recording has taken place.

Fig. 1 shows in area A where a portion of paper 52 has been broken away to expose web 30 and to illustrate how letters and numbers 80 are outlined on the web by clear areas exposing film 32. The remainder of the film 31 provides an opaque background for the letters so that a transparent record is obtained. The film 31 should be thin enough so that at the maximum marking current used the entire thickness of the film will be dissolved off the base film 32. It has been discovered that when a film 31 is employed which is no thicker than required to obtain opacity, then it is possible to dissolve less than the entire thickness off of base 32 by using marking currents of less than maximum magnitude. This partial removal of the metal film 31 at the marking points results in a translucency of the web 30 at these points. As a result it is possible to record gradations of color tone by effecting gradations of translucency ranging from full opaqueness to full transparency depending on the magnitude of the applied marking current. This characteristic of the system permits pictures to be recorded electrolytically on film similar to those formed chemically on photographic film. No electrical recording apparatus for making transparent recording heretofore has been capable of producing satisfactory translucent, half-tone recording.

In addition to the transparent or translucent record formed on the web 30 there is also obtained simultaneously a direct graphic recording of the same subject matter on the paper 52 as shown by letters and numbers 82. The record on paper 32 makes it possible to monitor the recording on web 30 since this web is taken up on roll 30′ as soon as recorded. The marked paper provides an additional permanent record of the recorded signals which may be read directly and does not require projection upon a screen for reading. The transparent record on web 30 may be reproduced by various known methods commonly used in lithography, photography, etc., in addition to projection upon a screen for reading.

Figure 3:
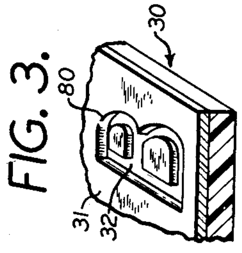
Fig. 3 is a fragmentary perspective view of a portion of a transparent record on a web.

Fig. 3 shows clearly how the full thickness of film 31 may be dissolved away to produce the clear area 80 on film base 32. As pointed out above if less than the full thickness were dissolved away, the area 80 would be translucent to transmitted light rather than transparent.

Figure 4:
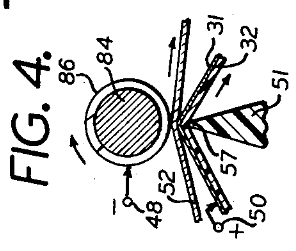
Fig. 4 is a sectional view of a portion of another recorder embodying the invention.

Instead of employing styli 42 as the negative electrode, it is possible to use a rotatable drum 84 carrying a helical electrode 86 as shown diagrammatically in Fig. 4. The marking signals will be applied at the positive terminal 50 to the metal film 31 which will contact the paper 52 only at the fine edge 57 of platen 51. The negative marking signals will be applied at the negative terminal 48′ which is electrically connected to the metal helical electrode 86. Other types of negative electrodes may be used.

If desired, the marking compound may be omitted from paper 52 so that it contains only an electrolyte such as potassium nitrate, sodium chloride, or the like, in aqueous solution. The paper web will then not be marked during the recording on web 30 although it will still be fully effective in dissolving the metal electrolytically out of film 31 during the recording operation. If it is not desired to employ previously impregnated paper, it is possible to fill compartment C with a liquid 88 consisting of an aqueous solution of a marking compound and/or a suitable electrolyte such as salt or acid. Roll 36 will then be inserted in a dry condition and being porous will take up the solution so that the web 52 will arrive at the marking line in a uniformly moist condition for effective marking of web 30.

Instead of gearing the drive of paper web 52 and web 30 so that they move at the same time, it is possible to arrange the gearing so that the paper 52 moves very slowly, much slower than the web 30. In such an arrangement, the marking compound will be omitted from the impregnant of the paper and the arrangement will be used as mentioned above in which other liquid 88 disposed in compartment C contains only an electrolyte. The porous paper would then be subject to a wicking action in which it draws liquid electrolyte from chamber C only as it tends to evaporate at the marking line. This arrangement will result in a considerable reduction in the consumption of paper without adversely affecting the quality of the transparent or translucent record produced on the web 30.

The metal film 31 may be deposited as a closely adhering coating on the transparent support 32 by any one of a variety of methods well known in the art, such as by evaporation of metallic vapor on the base, sputtering, etc.

In order to simplify somewhat the construction of the recorder shown in Figs. 1 and 2, it is possible to apply the positive voltage required by film 31, to bar 54 and/or bar 55, which bars would then be made of conductive material, preferably metal. This will result in the frame of the recorder formed by plates 10 and 12 acquiring a positive voltage. The recorder will operate wholly satisfactorily in this condition since the negative voltages are applied to styli 42 which are insulated and isolated from the frame of the recorder by block 44. As a further alternative, the positive voltages can be applied directly to the frame of the recorder, in which case bearings 35, 35′ and bars 54 and 55 may all be made of conductive material such as metal. The recorder frame will then have ground or datum potential while the electrodes 42 which are insulated from the frame will all be negative with respect to the recorder frame. Film 31 will then have the same potential as that of the frame and will therefore be positive with respect to electrodes 42.

What is claimed is:

1. A recorder for forming a transparent record, comprising a web including a flexible transparent base carrying an opaque metal film, means for continuously moving the web in one direction between supply and takeup means, means for applying a positive voltage to the metal film, a paper web impregnated with an electrolyte for passing current through said web, means for continuously advancing the paper in said direction with one side of the paper in contact with said metal film along a marking line, an electrode disposed to contact the other side of the paper and extending across said marking line, and means for applying a negative voltage to the electrode, whereby upon the passage of current from the metal film through the impregnated paper web to the electrode metal is electrolytically removed from the metal film thereby exposing the transparent base.

2. A recorder for forming a transparent record comprising supply means and takeup means, a first web including a flexible transparent plastic base carrying a thin opaque metal film, means for continuously driving the web in one direction from the supply means to the takeup means, means for applying a positive marking voltage to the film, a paper web impregnated with an electrolyte and a marking compound, means for continuously advancing the paper in said direction with one side of the paper in contact with said film along a marking line, a platen having a fine edge supporting said paper web and said first web at said marking line, an electrode disposed to contact the other side of the paper at said marking line, and means for applying a negative marking voltage to electrode at the other side of the paper so that marking currents passing through the paper and metal film dissolve portions of the metal off the plastic base to form a transparent record on the first web while the metal dissolved off the plastic base reacts with said marking compound to produce marks on said paper.

3. A recorder for forming a transparent record with an opaque background, comprising a web including a flexible transparent base carrying an opaque metal film, a platen having a fine marking edge, means for continuously moving the web over the platen, a paper web impregnated with an electrolyte for passing current through said web, means for advancing the paper over the platen in contact with said film at said marking edge, an electrode disposed to contact the paper at said marking edge and means for applying positive and negative marking voltages respectively to said film and said electrode so that metal dissolves off from said base to reveal portions of said transparent base.

4. A recorder according to claim 3, wherein said electrode is a rotatable member.

5. A recorder according to claim 3, wherein said electrode is a helical member mounted on a rotatable drum.

6. A recorder according to claim 3, wherein said electrode is a flexible stylus extending perpendicularly across said marking edge.

7. A recorder for forming a transparent record with an opaque background, comprising a web including a flexible transparent plastic base carrying an opaque metal film thereon, a platen having a fine marking edge, means for continuously moving the web over the platen, a paper roll, a compartment for rotatably supporting said roll, means for drawing a paper web impregnated with an electrolyte from said compartment and over the platen in contact with said film at said marking edge, a plurality of styli disposed in a parallel array in contact with the paper at said marking edge, and means for applying positive marking voltages to said film and negative marking voltages to said styli so that portions of said film are selectively dissolved electrolytically off said base and into said paper web.

8. A recorder for forming a transparent record with an opaque background, comprising a web including a flexible transparent plastic base carrying an opaque metal film thereon, a platen having a fine marking edge, means for continuously moving the web over the platen, a paper roll, a compartment for rotatably supporting said roll, means for drawing a paper web impregnated with an electrolyte from said compartment and over the platen in contact with said film at said marking edge, a plurality of styli disposed in a parallel array in contact with the paper at said marking edge, and means for applying positive marking voltages to said film and negative marking voltages to said styli so that portions of said film are selectively dissolved electrolytically off said base and into said paper web, said paper web also containing a marking compound capable of reacting with said metal to form marks on said paper web simultaneously with electrolytic dissolution of said portions of the film.

9. A recorder for forming a transparent or translucent record with an opaque background, comprising a web including a thin flexible transparent plastic base carrying an opaque metal film thereon, a platen having a fine marking edge, means for continuously moving the web over the platen, a moist porous paper roll impregnated with an electrolyte, means for rotatably supporting said roll, means for drawing a paper web from said roll and over said platen in contact with said film at said marking edge, electrode means disposed in contact with the paper at said marking edge, and means for applying positive marking voltages to said film and negative marking voltages to said electrode means so that portions of said film are selectively dissolved electrolytically off said base and into said web.

10. A recorder according to claim 9, wherein the first named web is drawn by the first named means over the platen at a different rate of speed than the speed of movement of the paper web over the platen.

11. A recorder comprising a frame structure defining a substantially closed compartment, a moist porous paper roll impregnated with an electrolyte and rotatably supported in said compartment, a platen having a fine marking edge, means for drawing a paper web from said roll and over said platen, another web including a thin flexible transparent plastic base carrying an opaque metal film thereon, means for drawing said other web between said platen and said paper web with said film in contact with one side of the paper only at said marking edge, electrode means disposed in contact with the other side of the paper at said marking edge, means for applying positive marking voltages to said film, and means for applying negative voltages to said electrode means, whereby portions of said film are selectively dissolved electrolytically off said plastic base and into said paper web.

12. A recorder according to claim 11, wherein said compartment contains a liquid electrolyte so that the paper web is drawn from said roll in a uniformly moist condition.

13. A recorder according to claim 12, wherein said liquid further contains a marking compound for reacting with the metal dissolved from said base to form colored marks in the paper web.

14. A recorder according to claim 11 wherein said electrode means are a plurality of flexible closely spaced metal stylii extending across the platen.

15. A recorder according to claim 11 wherein said electrode means is a rotatable member.

16. In a recorder, the combination comprising a base formed of insulation material, a metal film deposited on said base, a porous web disposed in contact with the film at a marking point on the base, and means for applying voltages of opposite polarity to the film and web respectively for electrolytically removing metal from the base at said marking point.

No references cited.